March 8, 1932.  M. H. ACKERMAN  1,848,595
SEAL RING
Filed Jan. 28, 1928
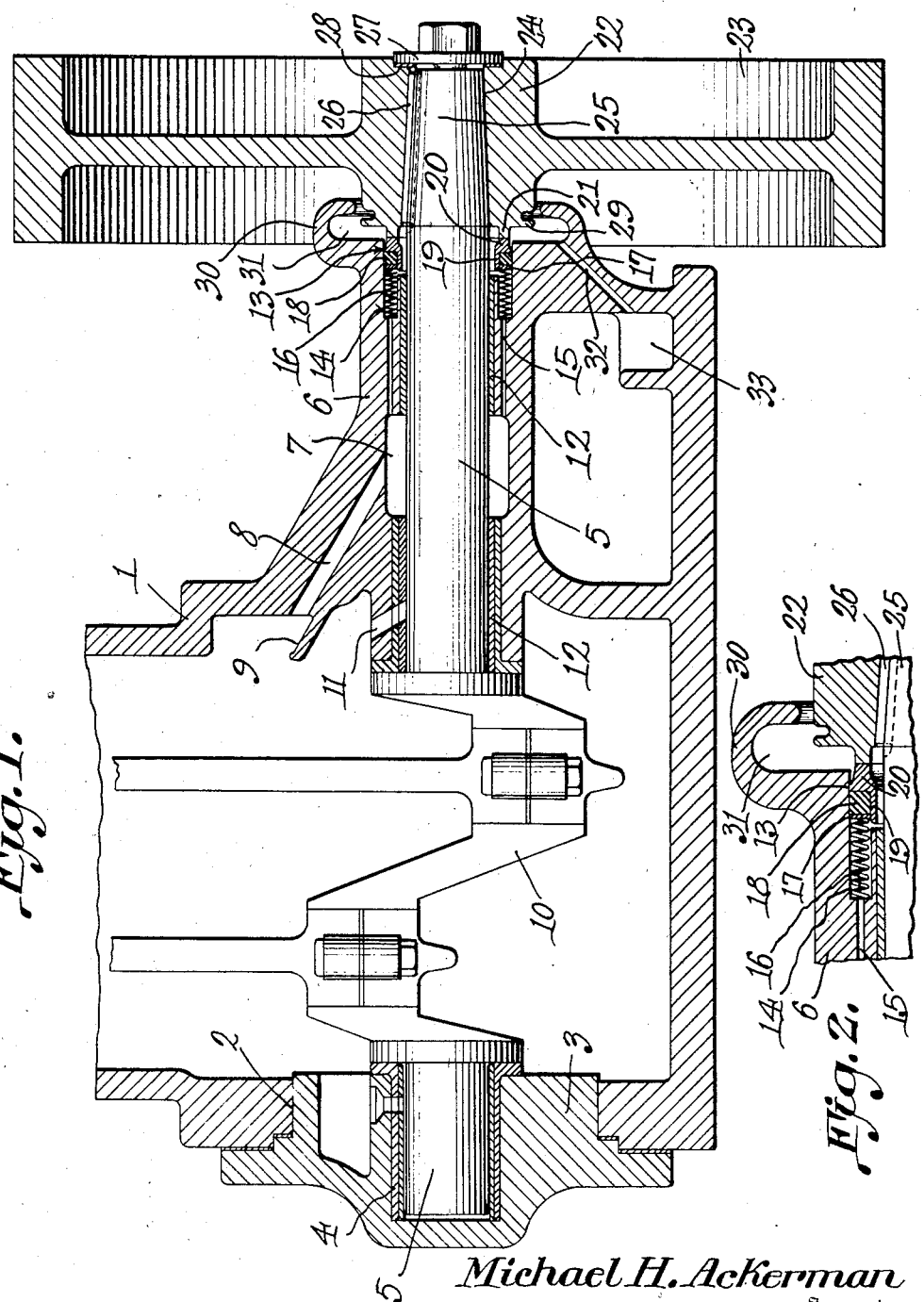
Michael H. Ackerman
Inventor
By C. A. Snow & Co.
Attorneys Patented Mar. 8, 1932

1,848,595

UNITED STATES PATENT OFFICE

MICHAEL HENRY ACKERMAN, OF MANSFIELD, OHIO, ASSIGNOR OF ONE-HALF TO LOUIS C. SICKEL, OF CALEDONIA, OHIO

SEAL RING

Application filed January 28, 1928. Serial No. 250,224.

This invention relates to a composite seal ring designed primarily for enclosed crank case refrigerating machines and pumping apparatus having rotating shafts, requiring a gas tight seal.

Conventional applications of packing and seals for this purpose have been objectionable; first, because in order to provide packing and replacement spaces for seals, the construction has been such that only the very small size compressors will pass through a thirty inch doorway when mounted as a unit motor, compressor, condenser, receiver, etc., on one base; second, because the types of seals generally used require a shoulder on the shaft, and means for moving the shaft in the bearings and into contact with shoulder, seals and walls bringing the shaft out of alinement with the cylinder bores; third, because where bearing is cast integral with the crank case, as is the general practice, the crank shaft has to be dismantled and partly removed to place the seal inside of bearing; fourth, because the outer or pulley wheel bearings requires a separate lubricating system; and, fifth, because the seal or stuffing box is interposed between the outer bearing and the crank case, preventing lubrication of the outer bearing from the crank case.

It is an object of the present invention to eliminate the objectionable features above enumerated by providing a crank case requiring a single sealing ring so located and constructed as to permit the base of the machine to be considerably reduced in size, effect a gas tight seal, allow for ample lubrication of the bearings, and permit removal of the seal ring without dismantling the shaft connections or interfering with the bearing.

A further object is to provide a pressure holding casing with a shaft which engages a bearing support in the wall of the casing and extends beyond the casing, there being a member on the shaft having a gas tight connection with the end of the shaft and a gas tight working connection with the wall of the casing.

A further object is to provide a seal between said member and the casing which includes a flexible gasket engaging the wall of a recess in the casing, there being a ring seated in the gasket beyond the outer end of the bearing and held by pressure against the adjacent end of the rotatable member on the shaft, said gasket allowing the ring to wobble and thereby compensate for the gyrations of the end of the rotatable member engaged thereby and insure at all times a gas tight seal between the ring and rotatable member.

Another object is the provision of a flexible gasket as a part of a seal with which is combined a means whereby gas pressure will automatically compress the gasket against the wall of the recess in which it is seated and maintain a running gas tight fit of the seal ring against the adjacent end of a member carried by and rotatable with the shaft.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings, the preferred form of the invention has been shown.

In said drawings,

Figure 1 is a section through the seal ring and adjacent parts of a refrigerating unit.

Figure 2 is an enlarged section through a portion of the ring.

Referring to the figures by characters of reference 1 designates the crank case of a compressor provided, in one side, with an opening 2 adapted to be closed by a removable cap 3 providing a bearing, which is suitably lined as at 4, for one end of a crank shaft 5. The opening 2 is of such size as to permit longitudinal withdrawal of the shaft therethrough after the cap 3 has been removed.

Extending from the opposite side of the crank case is an extension 6 adapted to receive a portion of the crank shaft 5 and also the composite seal ring which constitutes the present invention. An annular lubricant reservoir 7 is provided in the extension 6 around shaft 5 and is supplied with lubricant from a downwardly inclined bore 8 leading from a lip 9 extending into the crank case from one wall thereof where it can trap lubricant splashed within the crank case by the cranks 10 of the shaft 5. That portion of the shaft between the cranks 10 and the reservoir 7 can also be supplied with lubricant through an opening 11 located in the inner portion of the crank case as shown.

The extension 6 is suitably lined for the shaft 5 as shown at 12. The outer end of the extension is counterbored at 13 and formed in the inner end wall of the counterbore are pockets 14 which communicate with the reservoir 7 through ducts 15. A coiled spring 16 is seated in each pocket 14. Any desired number of the pockets can be provided and each pocket contains a spring 16. The outer ends of the springs bear against a metal washer 17 which constitutes a part of the composite seal ring and thrusts against a ring 18 of rubber or other suitable compressible and resilient material which also forms a part of the seal ring. Both the washer and the ring extend around a circular flange 19 forming a part of and extending from the metal contact ring 20 forming the remaining portion of the composite seal ring. This contact ring is located in the bore 13 and provides an abutment for the ring 18. The contact ring and its flange are spaced from the shaft 5 and the outer face of the contact ring is ground down so as to make a smooth and sealing contact with a circular rib 21 extending inwardly from the hub 22 of the flywheel 23.

The hub 22 has a tapered bore 24 in which is seated the tapered end 25 of shaft 5. A removable key 26 can be used for holding the flywheel and shaft against relative rotation and a flanged screw 27 can be used for holding the flywheel detachably to the shaft. Packing 28 is preferably interposed between the hub of the flywheel and the flanged head of the screw 27 so as to allow for a tight fit.

The inner end of the hub 22 is formed with an annular groove 29 and this grooved portion is surrounded by a flange 30 integral with and projecting from the extension 6. Flange 30 is so shaped as to form an annular channel or gutter 31 the lowermost portion of which is adapted to drain through a passage 32 into a receiving compartment 33 located beneath the extension 6.

In assembling the parts the shaft 5 is inserted through opening 2 into extension 6 and cap 3 is fastened in place so as to provide one bearing for the shaft. Springs 16 are inserted into the bores 14. The ring 18 and washer 17 are then placed around flange 19 of the contact ring after which the entire composite seal ring is inserted into the counterbore 13. Key 26 is thereafter placed in engagement with the tapered end of the shaft, hub 22 is forced on to the shaft against contact ring 20, and screw 27 is tightened to fasten the wheel to the shaft.

As the shaft rotates during the operation of the unit, lubricant will be splashed on to the lip 9 and drain downwardly to reservoir 7 from which it will be distributed through ducts 15 to the bores 14 and thence into the space around shaft 5 and surrounded by ring 20 and its flange 19. Consequently this lubricant will act as a seal to prevent escape of gas and will also keep the contacting faces of the hub and ring properly lubricated. Surplus lubricant flowing from the contacting surfaces will be collected by the groove 29 and the gutter or channel 31 and will drain to the receiver 33 from which it can be subsequently removed.

Attention is directed to the fact that the wheel can be removed and the packing replaced without changing the position of the shaft. This is an important item because it greatly simplifies the installation of the packing.

Pressure of the springs against the metal washer expands the elastic ring against the wall of the counterbore to hold the seal ring against rotation until pressure of fluid from within the crank case is applied thereto. The springs also serve to hold the seal against atmospheric pressure or the leakage of non-condensable gas, such as air, into the system of which the compressor is a part, when a vacuum is pumped.

As is well known to those skilled in the art of refrigeration there exists in a compressor two pressure areas; the discharge or condensing pressure of 150 pounds or more and the suction pressure of approximately 5 to 20 pounds. The seal ring constituting this invention is intended to seal the shaft at its bearing and prevent leakage of the suction pressure which usually occurs. While a compressor is idle, it frequently happens that the condensing pressure leaks through the compressor valve and, to withstand this, it is essential that the seal be capable of withstanding all pressures up to approximately 165 pounds. The present compositie seal ring has been found very efficient in meeting these conditions. It is also essential in refrigerating machines that the seal used in the shaft bearing of the compressor be efficient as a means for preventing leakage of air through the bearing from the outside. Frequently a vacuum must be created in the system after repairs have been made or when a system is being started, or because of interruption of the supply of refrigerant to the evaporating coils. To meet this condition the packing or seal provided in the shaft bearing must be able to withstand this vacuum pressure. The present composite seal ring will meet all of these requirements.

As the compressible ring or gasket 18 is mounted on the flange 19 between contact ring 20 and washer 17, the greater portion of the surface thereof is protected against the deteriorating action of the lubricant and the refrigerating gas. Furthermore as the periphery of the contact ring is relatively narrow, as shown, and as the compression of the gasket or ring 18 results in its radial expansion so as to fit tightly against the inner surface of the extension 6 in which the shaft is mounted, a slight rocking or wabble motion of the metal parts of the composite seal ring by the wheel hub 22 or other shaft member, due to inaccuracy of machine work, weight of the fly wheel, or the whipping action exerted by the cranks and their connections, will be permitted without affecting the sealing action and without requiring the use of special compensating devices. Thus the seal ring also constitutes a compensating ring.

What is claimed is:

1. The combination with a casing having a chamber for confining gas, there being a recess in the wall of the casing and a bearing in the recess, of a shaft projecting from the chamber, said shaft engaging the bearing and extending through the recess and beyond the casing, a member on the end of the shaft and rotatable therewith, a flexible gasket engaging the wall of the recess, a ring surrounded by and seated in the flexible gasket, a portion of the ring overlapping the front surface of the gasket and having a gas tight working fit against one end of said member, said ring being supported by the gasket and having a clearance between said ring and the wall of the recess to provide for gyration when subjected to wobble action by the engaged end of said member, and means for placing the inner surface of the gasket into communication with the contents of the chamber to develop sufficient pressure to maintain a constant gas tight working fit between the ring and the inner end of the member and prevent escape of any of the gas from the chamber along the wall of the recess and between said ring and the member.

2. A combination with a casing having a chamber for holding a fluid under pressure, and a bearing element supported by the casing, there being a shaft receiving space in said bearing element, a shaft extending from the chamber and bearing in said space, said shaft projecting beyond the casing, and a relatively massive rotating element carried by the shaft and rotatable therewith, said element having a hub extending toward the casing, there being a recess in one of said elements, of a flexible gasket bearing against the wall of said recess, a sealing ring seated in and surrounded by the gasket and overlapping the outer face thereof, said ring having a tight working fit against the end of the opposed element and being supported by the gasket, there being a clearance between said ring and the wall of the recess to provide for wobble motion during the rotation of one of the elements relative to the other, and means for maintaining the inner surface of the gasket in communication with the contents of the chamber for developing pressure in the rear of said gasket sufficiently strong to prevent escape of any of the contents of the chamber along the wall of the recess and between the ring and the bearing element engaged thereby.

3. The combination with a casing having a chamber for holding fluid under pressure, a shaft support in the wall of the casing there being a recess beyond the support, and a shaft extending from the chamber and engaging the support, one end of the shaft projecting through the recess and beyond the support, a relatively massive rotating element having a hub extending toward the support, of a sealing ring in said recess and having a sealing face contacting with the end of the hub, a flexible gasket, said ring being seated in the gasket and overlapping the outer surface thereof, and means for placing the inner surface of said gasket into communication with the contents of the chamber, both of said means being adapted to maintain the gasket expanded radially against the wall of the recess with a pressure sufficiently strong to prevent flow of fluid toward or from the chamber along the wall of the casing, there being a clearance between the ring and the wall of the recess whereby said gasket, when under pressure, constitutes means for yieldingly holding the ring if subjected to wobble motion of the projecting portion of the shaft and the hub thereon.

4. In a seal for the bearing of a shaft the end of which shaft projects from a chamber adapted to contain a fluid under pressure and through the chamber casing beyond the bearing support for said shaft, thereby tending to produce a gyrating motion at the end of the shaft, said shaft end carrying a relatively massive rotating element having a hub extending into the casing, there being a counterbored recess in said casing, a flexible gasket seated in said counterbore, a sealing ring seated in the gasket and having a sealing face contacting with the end of said hub, said ring being held by the gasket, there being a clearance between said ring and the wall of the recess to provide for wobble movement when subjected to gyrating action of the end of the hub, and means for placing the inner surface of said gasket into communication with the contents of the chamber for developing pressure in the rear of said gasket sufficiently strong to prevent escape of any of the contents of the chamber along the wall of the casing.

5. The combination with a casing having a chamber for confining gas, there being a recess in the wall of the casing and a bearing in the recess, of a shaft projecting from the chamber, said shaft engaging the bearing and extending through the recess and beyond the casing, a member on the end of the shaft and rotatable therewith, a gas tight seal at the terminal end of the shaft and outer end of the member, a flexible gasket engaging the wall of the recess, a ring surrounded by and seated in the flexible gasket, a portion of the ring overlapping the front surface of the gasket and having a gas tight working fit against one end of said member, said ring being supported by the gasket, there being a clearance between said ring and the wall of the recess to provide for gyration when the ring is subjected to wobble action by the engaged end of said member, and means for placing the inner surface of the gasket into communication with the contents of the chamber to develop sufficient pressure to maintain a constant gas tight working fit between the ring and the inner end of the member and prevent escape of any of the gas from the chamber along the wall of the recess and between said ring and the member.

In testimony that I claim the foregoing as my own, I have hereto affixed my signature.

MICHAEL HENRY ACKERMAN.